(12) United States Patent
Yamamoto et al.

(10) Patent No.: US 6,192,268 B1
(45) Date of Patent: Feb. 20, 2001

(54) RADIATION THERMOMETER

(75) Inventors: Tetsuya Yamamoto; Shunji Egawa, both of Saitama (JP)

(73) Assignee: Citizen Watch Co. Ltd., Tokyo (JP)

( * ) Notice: Under 35 U.S.C. 154(b), the term of this patent shall be extended for 0 days.

(21) Appl. No.: 09/341,504

(22) PCT Filed: Nov. 13, 1998

(86) PCT No.: PCT/JP98/05117

§ 371 Date: Jul. 12, 1999

§ 102(e) Date: Jul. 12, 1999

(87) PCT Pub. No.: WO99/25240

PCT Pub. Date: May 27, 1999

(30) Foreign Application Priority Data

Nov. 14, 1997 (JP) .................................................... 9-312971
Nov. 14, 1997 (JP) .................................................... 9-312972

(51) Int. Cl.[7] .................................................................. A61B 5/00
(52) U.S. Cl. ............................. 600/474; 600/549; 374/121
(58) Field of Search .................................... 600/474, 549; 374/124, 126, 128, 129, 132, 133, 121

(56) References Cited

U.S. PATENT DOCUMENTS

| | | | | |
|---|---|---|---|---|
| 4,784,149 | * | 11/1988 | Berman et al. | 128/664 |
| 4,790,324 | * | 12/1988 | O'Hara et al. | 128/664 |
| 5,150,969 | * | 9/1992 | Goldberg et al. | 374/128 |
| 5,159,936 | * | 11/1992 | Yelderman et al. | 128/736 |
| 6,047,205 | * | 4/2000 | Pompei | 600/474 |
| 6,102,564 | * | 8/2000 | Egawa | 374/129 |

FOREIGN PATENT DOCUMENTS

| | | |
|---|---|---|
| 2263125 | 10/1990 | (JP) . |
| 4109928 | 4/1992 | (JP) . |

* cited by examiner

Primary Examiner—Marvin M. Lateef
Assistant Examiner—Eleni Mantis Mercader
(74) Attorney, Agent, or Firm—Townsend and Townsend and Crew LLP

(57) ABSTRACT

A radiation thermometer which starts body temperature measuring operations when a temperature measurement switch is pressed, inserts a probe into an opening of a living being, receives an infrared ray from within the opening and computes a temperature, and displays a maximum value of measured temperature data as a body temperature, for the purpose of avoiding temperature measurement and displaying of a temperature executed by manipulation of the temperature measurement start switch after insertion of the probe into an opening of a living being, a careless manipulation of the switch after insertion into an external acoustic opening despite a previous normal manipulation of the switch before insertion, etc., comprises an operation judging means which determines whether the temperature measurement start switch is appropriately manipulated, such that the radiation thermometer issues a warning which is indicative of an erroneous operation or an erroneous operation does not influence normal temperature measuring operations.

11 Claims, 7 Drawing Sheets

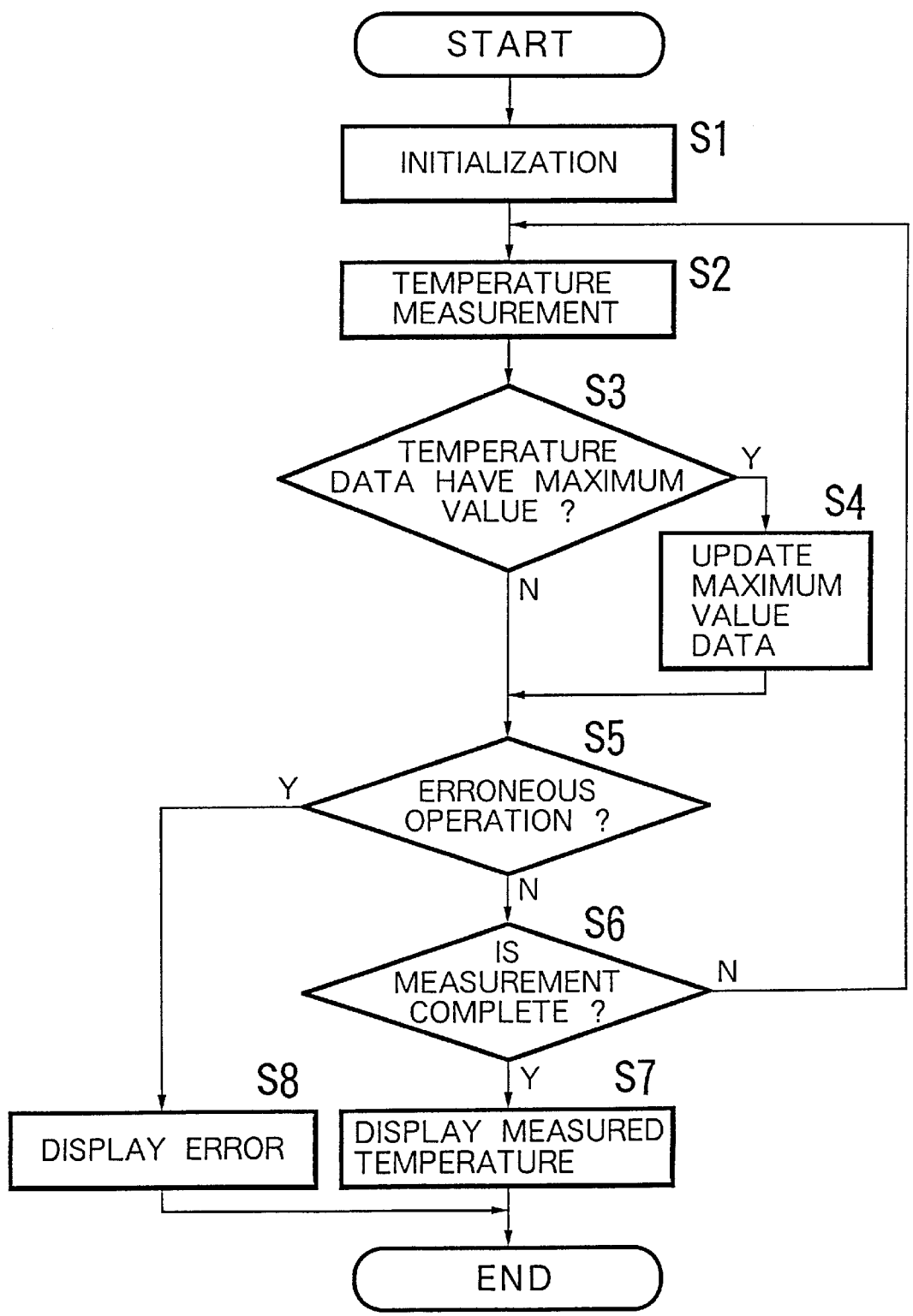

RADIATION THERMOMETER

TECHNICAL FIELD

The present invention relates to a radiation thermometer.

BACKGROUND ART

There has heretofore been proposed a radiation thermometer wherein an external acoustic opening, which is an opening of a living being is selected as a measurement site for, measuring a body temperature in a short period of time, and infrared rays from an eardrum and the external acoustic opening which are a measurement target are detected with an infrared ray sensor to measure a body temperature of the living being. In such a radiation thermometer, a probe is inserted into an external acoustic opening which is an opening of a living being so that an infrared ray sensor detects an infrared ray which is incident upon the probe. Since the probe does not perfectly face the eardrum even when inserted into the external acoustic opening, both the temperature of the eardrum and temperature of the external acoustic opening are measured. However, the external acoustic opening usually has approximately the same temperature as the eardrum, and therefore, it is possible to measure a temperature which is close to the eardrum temperature even though both temperatures are measured.

An example of such radiation thermometer is described in Japanese Patent Publication No. 63851/1994. This radiation thermometer measures temperature only once at the moment that a measurement switch is pressed, with a probe inserted into an external acoustic opening in advance. However, since the probe is usually left in a room or the like before measurement and hence in many cases has a lower temperature than an eardrum temperature, when the probe as such is inserted into an external acoustic opening, the external acoustic opening which is used to have approximately the same temperature as an eardrum is cooled by the probe. For this reason, the radiation thermometer which is described in the abovementioned Patent Publication measures a temperature of the cooled external acoustic opening together with an eardrum temperature, and therefore, cannot accurately measure the eardrum temperature.

Noting this, a radiation thermometer described in Japanese Laid-open Patent Publication No. 263125/1990 measures a temperature which is close to an actual eardrum temperature rather than an eardrum temperature which is cooled by the probe. This radiation thermometer includes a peak hold circuit so as to display the highest temperature of measured temperatures. As a manipulation method for this purpose, before inserting the probe into the external acoustic opening, a measurement switch is to be pressed to start measuring of a temperature. Since measurement of a temperature is executed before inserting the probe into the external acoustic opening in this manner, it is possible to measure a temperature which is close to an eardrum temperature at the time of insertion of the probe before the external acoustic opening is cooled, i.e., a peak temperature, instead of measuring the eardrum temperature and a temperature of a cooled external acoustic opening.

However, this radiation thermometer starts temperature measurement in a condition in that an external acoustic opening is cooled by the probe if a user (measuring person) fails to follow operation procedures and presses the measurement switch after inserting the probe into the external acoustic opening as described above, and therefore, the radiation thermometer fails to measure a desired peak temperature, ends up in measuring a lower eardrum temperature than the peak temperature and a temperature of the cooled external acoustic opening, and eventually displays a lower temperature than an actual body temperature.

On the other hand, since the peak hold circuit of the radiation thermometer which is described in Japanese Laid-open Patent Publication No. 263125/1990 is designed to be reset each time the measurement switch is pressed and body temperature measuring operations are started, as the measurement switch is pressed again after inserting the probe into the external acoustic opening, a maximum temperature detected during insertion is reset. The radiation thermometer accordingly displays a maximum temperature measured after the measurement switch is manipulated for the second time. The displayed temperature is an eardrum temperature and a temperature of the cooled external acoustic opening cooled by the probe, and as such, is lower than an actual body temperature.

The present invention has been made in view of the problems above. Accordingly, an object of the present invention is to provide a radiation thermometer which starts temperature measurement with a measurement switch upon manipulation thereof before inserting the probe into the external acoustic opening and displays a maximum temperature of measured temperatures as a body temperature, characterized by indication of an erroneous operation after judging whether the measurement switch is appropriately manipulated or avoids displaying a temperature which is measured by erroneous operation.

BRIEF DESCRIPTION OF DRAWINGS

FIG. 3 is a flow chart showing operations of the radiation thermometer according to the first embodiment of the present invention;

BEST MODE FOR CARRYING OUT THE INVENTION

The present invention will be described in the following with reference to the associated drawings.

Figures 1A, 1B:
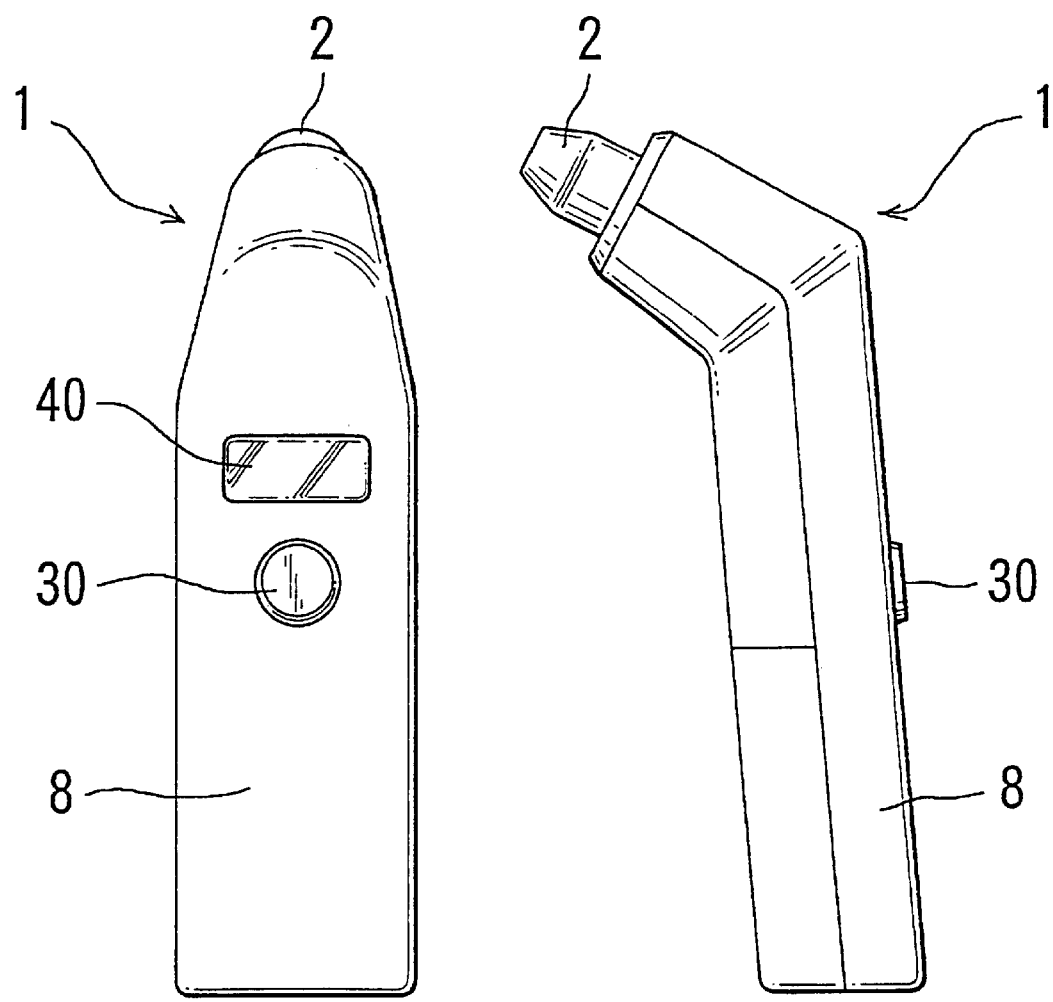
FIGS. 1(a) and 1(b) are a front view and a side view, respectively, of a radiation thermometer according to a first preferred embodiment of the present invention.

FIGS. 1(a) and 1(b) are a front view and a side view, respectively, of a radiation thermometer according to a first embodiment of the present invention. A radiation thermometer 1, comprising a main portion 8 and a probe 2, is designed to receive infrared rays radiated from an eardrum and an external acoustic opening and measure an eardrum temperature and an external acoustic opening temperature. The main portion 8 comprises a liquid crystal display portion 40 for displaying a body temperature a temperature measured based on received infrared rays, and a measurement switch 30 for starting measurement of a temperature.

The radiation thermometer 1 measures a body temperature in the following manner.

First, when the measurement switch 30 which is disposed at the main portion 8 is pressed, the radiation thermometer 1 is turned on and measurement of a temperature is started. The probe 2 is thereafter inserted into an external acoustic opening of a user, directed to an eardrum and receives infrared rays radiated from the eardrum and the external acoustic opening. Upon completion of measurement, a buzzer sounds to indicate the end of the measurement, and the probe 2 is taken out of the external acoustic opening. The liquid crystal display portion 40 displays the temperature of the eardrum and the external acoustic opening, namely, a body temperature.

Figure 2:
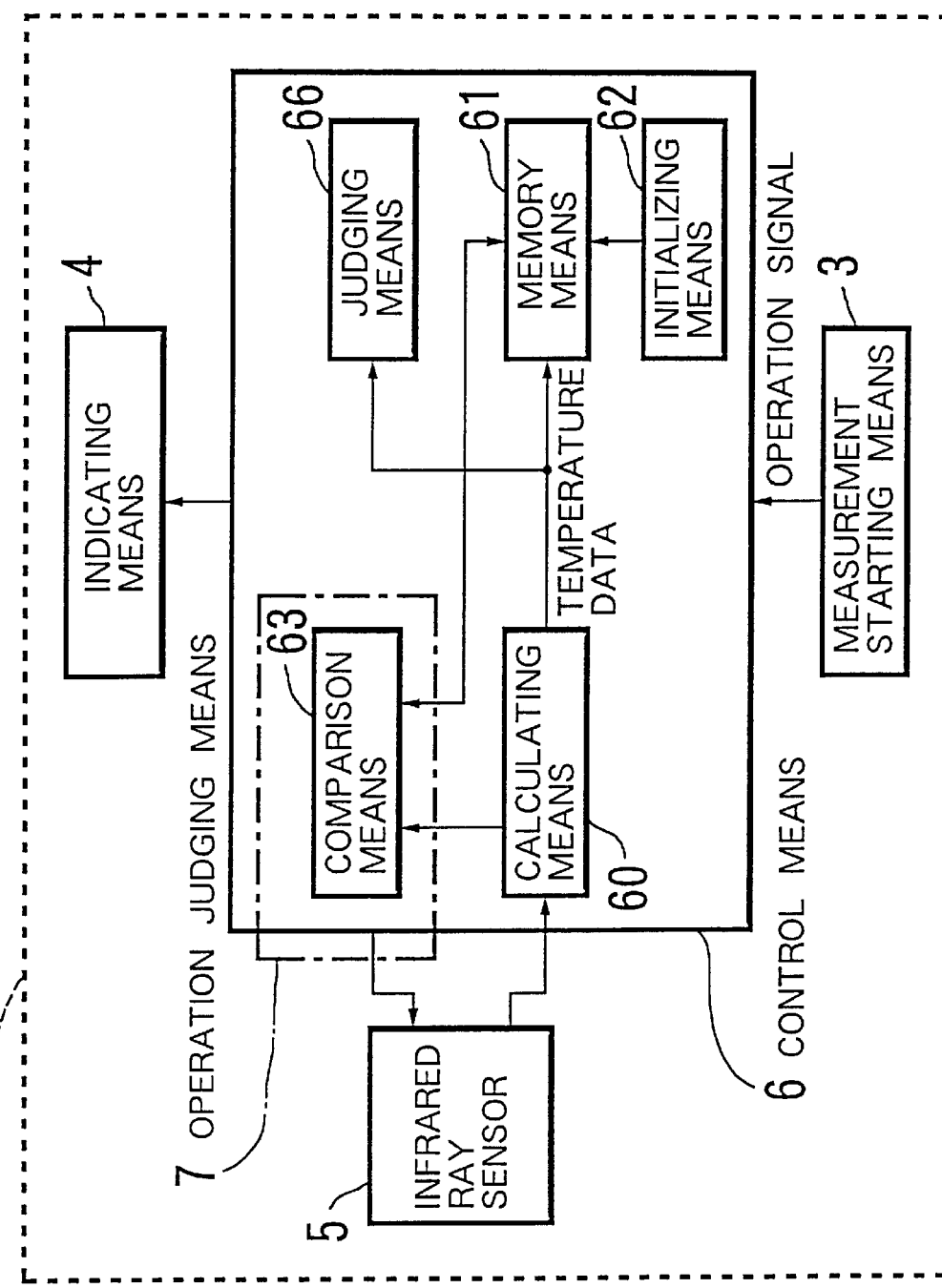
FIG. 2 is a block diagram of the radiation thermometer shown in FIGS. 1(a) and 1(b)

FIG. 2 is a block diagram of the radiation thermometer 1. The radiation thermometer 1 comprises measurement starting means 3, an infrared ray sensor 5, control means 6 and indicating means 4. The measurement starting means 3 comprises the measurement switch 30, while the indicating means 4 comprises the liquid crystal display portion 40.

The measurement starting means 3 is connected to the control means 6, so that as a result of a predetermined manipulation, that is, pressing of the measurement switch 30, the measurement starting means 3 sends out an operation signal for starting measurement. The infrared ray sensor 5 and the indicating means 4 are connected to the control means 6, so that the control means 6 controls the infrared ray sensor 5 in response to the operation signal from the measurement starting means 3 and controls to cause the liquid crystal display portion 40 of the indicating means 4 to display a measured temperature.

The control means 6 comprises calculating means 60 for converting data obtained from the infrared ray sensor 5 into temperature data, memory means 61 for storing a maximum value of the temperature data outputted from the calculating means 60, initializing means 62 for resetting the maximum value of the temperature data stored in the memory means 61, and comparison means 63 for comparing the temperature data outputted from the computing means 60 with a predetermined condition. In the first embodiment, the comparison means 63 forms operation judging means 7 which determines whether proper operations were conducted for the purpose of measuring a temperature.

Next, operations of the radiation thermometer according to the first embodiment will be described with reference to the flow chart in FIG. 3.

When a user presses the measurement switch 30 (START), the initializing means 62 initializes temperature data which are held in the memory means 61, which is the initialization processing (S1). The infrared ray sensor 5 outputs a signal which corresponds to a measured temperature to the calculating means 60, and the calculating means 60 calculates and outputs temperature data based on this signal (S2). The comparison means 63 compares maximum value data which are stored in the memory means 61 with the temperature data outputted from the calculating means 60 (S3), and when the temperature data are larger, the maximum value data which are stored in the memory means 61 are updated with the temperature data which are updating maximum value data (S4).

On the other hand, the comparison means 63 compares the temperature data outputted from the calculating means 60 with a predetermined condition which will be described later, and determines whether the measurement switch 30 was pressed after the probe 2 was inserted into an external acoustic opening, i.e., if there is an erroneous operation (S5). When the comparison means 63 determines that there is not an erroneous operation, judging means 66 thereafter determines whether the measurement is complete based on the predetermined condition (S6). When the judging means 66 determines that the measurement is complete, the body temperature measuring operations are completed, the control means 6 controls in such a way that the indicating means 4 displays the maximum value data which are stored in the memory means 61, and the liquid crystal display portion 40 of the indicating means 4 displays the measured temperature which is a body temperature (S7). When the judging means 66 determines at step S6 that a predetermined measurement complete condition is not met, the sequence returns to temperature measurement (S2) and the body temperature measuring operations are repeated until the predetermined measurement complete condition is met. Further, when the comparison means 63 determines at step S5 that there is an erroneous operation, the comparison means 63 controls the indicating means 4 so as to show a warning message (e.g., "Error") which is indicative of incorrect operation procedures, and the liquid crystal display portion 40 displays such a warning (S8). In other words, the comparison means 63 outputs an erroneous operation warning signal.

Next, operations for judging an erroneous operation at step S5 will be described.

Assuming that T1 indicates temperature data which are measured for the first time after the measurement switch 30 is pressed, T2 indicates temperature data which are measured subsequently for the second time, and T3 indicates temperature data which are measured for the third time, when T1 is equal to or higher than a predetermined value (32° C., for example) and the second-time and the third-time measurement data T2, T3, . . . are lower than the first-time temperature data T1 for each one of the predetermined times (e.g., two times), that is, when the second-time temperature data T2 and the third-time temperature data T3 are lower than the first-time temperature data T1, it is judged that there is an erroneous operation. In other cases than this, it is judged that there is not an erroneous operation.

Next, the condition for judging if there is an erroneous operation will be described with reference to FIGS. 4(a) and 4(b).

Figure 4A:
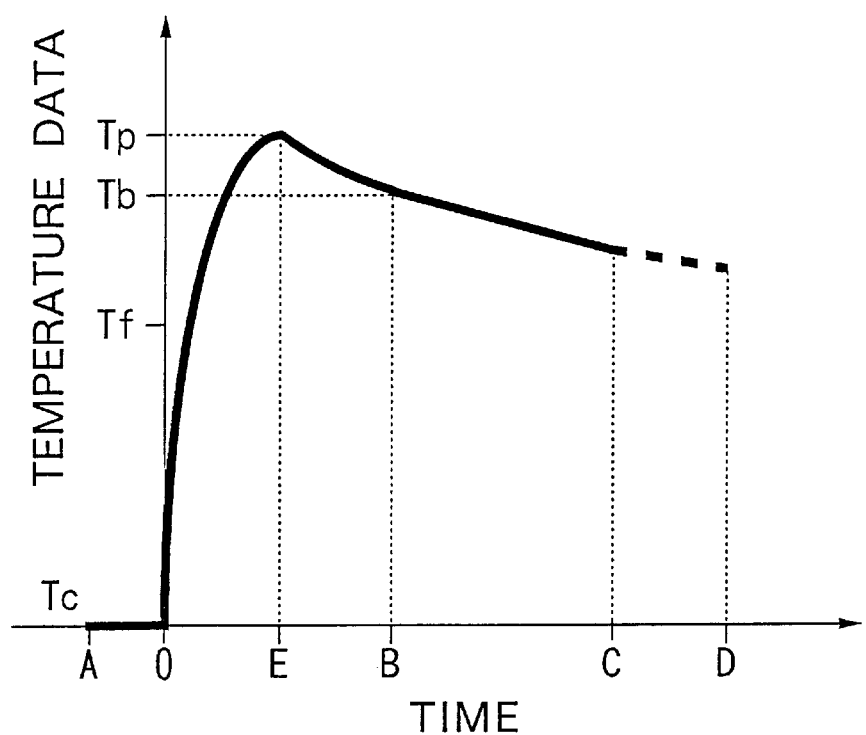
FIG. 4(a) is a view showing a change in temperature data over time with a probe inserted into an external acoustic opening during normal measuring operations in the first embodiment.
Figure 4B:
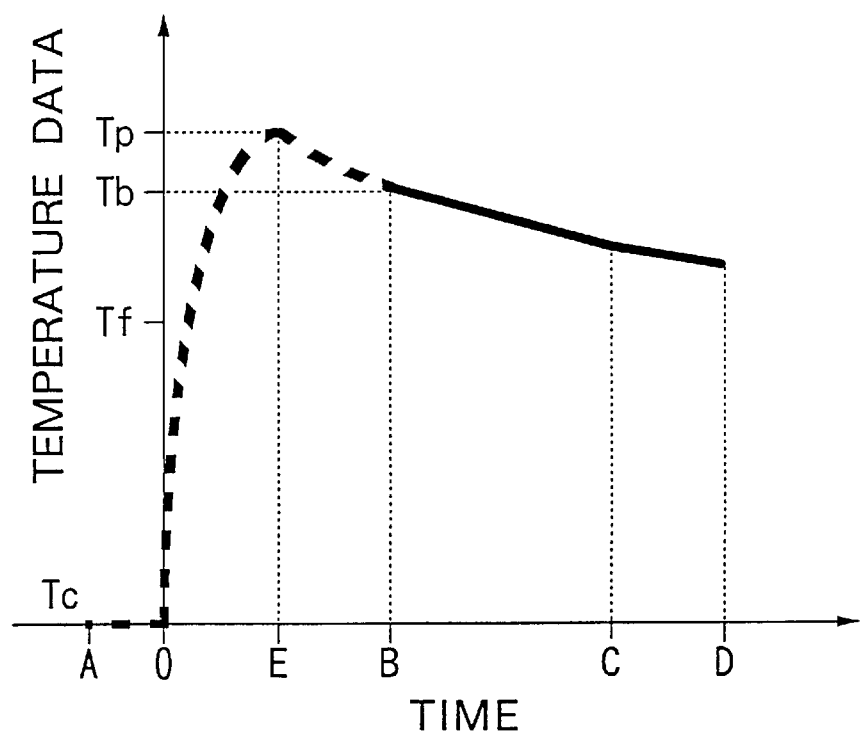
FIG. 4(b) is a view showing a change in temperature data over time with the probe inserted into an external acoustic opening during an erroneous operation in the first embodiment.

FIG. 4(a) is a graph showing a change in temperature data over time with the probe 2 inserted into an external acoustic opening immediately after the measurement switch 30 is pressed (normal operations), while FIG. 4(b) is a graph showing a change in temperature data over time with the measurement switch 30 pressed after the probe 2 is inserted into an external acoustic opening (erroneous operation).

First, a description will be given in a case where temperature measurement is conducted through normal operations, with reference to FIG. 4(a).

The letter "A" indicates a time at which the measurement switch 30 is pressed, and the figure "0" indicates a time at which the probe 2 is inserted into an external acoustic opening.

The radiation thermometer 1 starts body temperature measuring operations immediately after time "A" once the measurement switch 30 is pressed even before the probe 2 is inserted into an external acoustic opening, and therefore, during a period from the time "A" to the time "0", temperature data Tc regarding a target to which the probe 2 is directed are outputted. Although a value of the temperature data Tc under measurement changes when a target to which the probe 2 is directed is changed, a value of the temperature data Tc is hypothetically assumed to be constant. Since a temperature is usually measured in a room or the like, the temperature data Tc have a predetermined value Tf (32° C., for example) or a smaller value. While data which are measured by the infrared ray sensor 5 are converted into temperature data by the calculating means 60 and a maximum value of the data is updated and stored in the memory means 61, since a temperature Tp at a time "E" which is immediately after the probe 2 is inserted into the external acoustic opening is a maximum value up to that point, the temperature data Tp are stored in the memory means 61. Since the probe 2 cools the external acoustic opening at and after the time "E", outputted temperature data have a progressively smaller value. The body temperature measuring operations end at a time "C" at which the predetermined measurement completion condition is satisfied, and the liquid crystal display portion 40 of the indicating means 4 displays the peak temperature Tp which is a maximum value of the temperature data stored in the memory means 61 up to that point.

Thus, when the probe 2 is inserted into an external acoustic opening after the measurement switch 30 is pressed, temperature data which are equal to or lower than a predetermined value Tf (32° C., for example) are outputted during a period from the time A, which is before the probe 2 is inserted into the external acoustic opening, to the time "0", and hence, the temperature data measured for the first time are Tf (32° C.) or lower, and the comparison means 63 determines that there is not an erroneous operation. Next, a description will be given in a case where the measurement switch 30 is pressed after the probe 2 is inserted into an external acoustic opening, with reference to FIG. 4(b).

The figure "0" indicates a time at which the probe 2 is inserted into an external acoustic opening, and the letter "B" indicates a time at which the measurement switch 30 is pressed. Hence, temperature data are actually outputted at time "B" or after. However, for easy comparison with FIG. 4(a), the dotted line indicates temperature data which are outputted by the time "B" assuming that the measurement switch 30 is pressed at the time "A". Since the probe 2 is inserted into the external acoustic opening at the time "0" and the measurement switch 30 is pressed at the time "B", a peak temperature Tp at the time "E" is not measured. Instead, temperature data Tb which are measured at the time "B" while the probe 2 cools down a temperature of the external acoustic opening are stored in the memory means 61 as the first-time measurement data T1. Following this, body temperature measuring operations are continued while measuring the second-time, the third-time and subsequent temperature data T2, T3, . . . , and the body temperature measuring operations end at a time "D" at which the predetermined measurement completion condition is satisfied.

Thus, when the measurement switch 30 is pressed after the probe 2 is inserted into an external acoustic opening, the first-time measurement data T1 are measured with the probe 2 inserted into the external acoustic opening, and therefore, the first-time measurement data T1 are usually equal to or higher than the predetermined value Tf (32° C., for example). Further, since the probe 2 cools the external acoustic opening after this, the second-time, the third-time and subsequent temperature data T2, T3, . . . have smaller values than the first-time measurement data T1. Hence, the comparison means 63 determines that there is an erroneous operation.

In the first embodiment, the comparison means 63, on a condition that data measured for the first time are equal to or higher than a predetermined value (32° C., for example) and that as a result of a comparison of the first-time measurement data with subsequent measurement data, the subsequent measurement data are lower than the first-time measurement data for each one of the predetermined times (two times, for instance), causes the indicating means 4 to indicate an erroneous operation.

However, the present invention is not limited to this condition. Alternatively, the comparison means 63 may determine that there is an erroneous operation and cause a warning to be issued only on a condition that subsequent measurement data are found to be lower than first-time measurement data for each one of the predetermined times as a result of a comparison of the first-time measurement data with the subsequent measurement data. Referring to FIG. 4(a), for instance, between the time "A" and the time "0", depending on the manner in which a front tip of the probe is directed, it is possible that the second-time and the third-time measurement data are lower than first-time measurement data only by chance. In this case, the "predetermined times" may be defined as the number of times which cannot be an accidental number of times, e.g., five or six times, so that an erroneous operation will not be determined during the period between the time "A" and the time "0".

Further, the comparison means 63 may determine that there is an erroneous operation and cause a warning to be issued only on condition that data which are measured for the first time are equal to or higher than a predetermined value (32° C., for example). The "predetermined value" is not limited to 32° C., but is preferably set between a body temperature and an ambient temperature for conducting measurement.

In the first embodiment, an erroneous operation is determined when the measurement switch 30 is not pressed before the probe 2 is inserted into an external acoustic opening and the measurement switch 30 is pressed only after the probe 2 is inserted into the external acoustic opening, and instead of displaying a temperature of the external acoustic opening which is cooled by the probe 2, an erroneous operation is indicated.

Now, a radiation thermometer according to a second embodiment of the present invention will be described. Since the appearance and operations of the radiation thermometer are the same as those according to the first embodiment shown in FIG. 1, redundant description will be omitted. Instead, structure portions which are the same as those according to the first embodiment will be used with the same reference symbols in the following, and therefore, will not be described.

Figure 5:
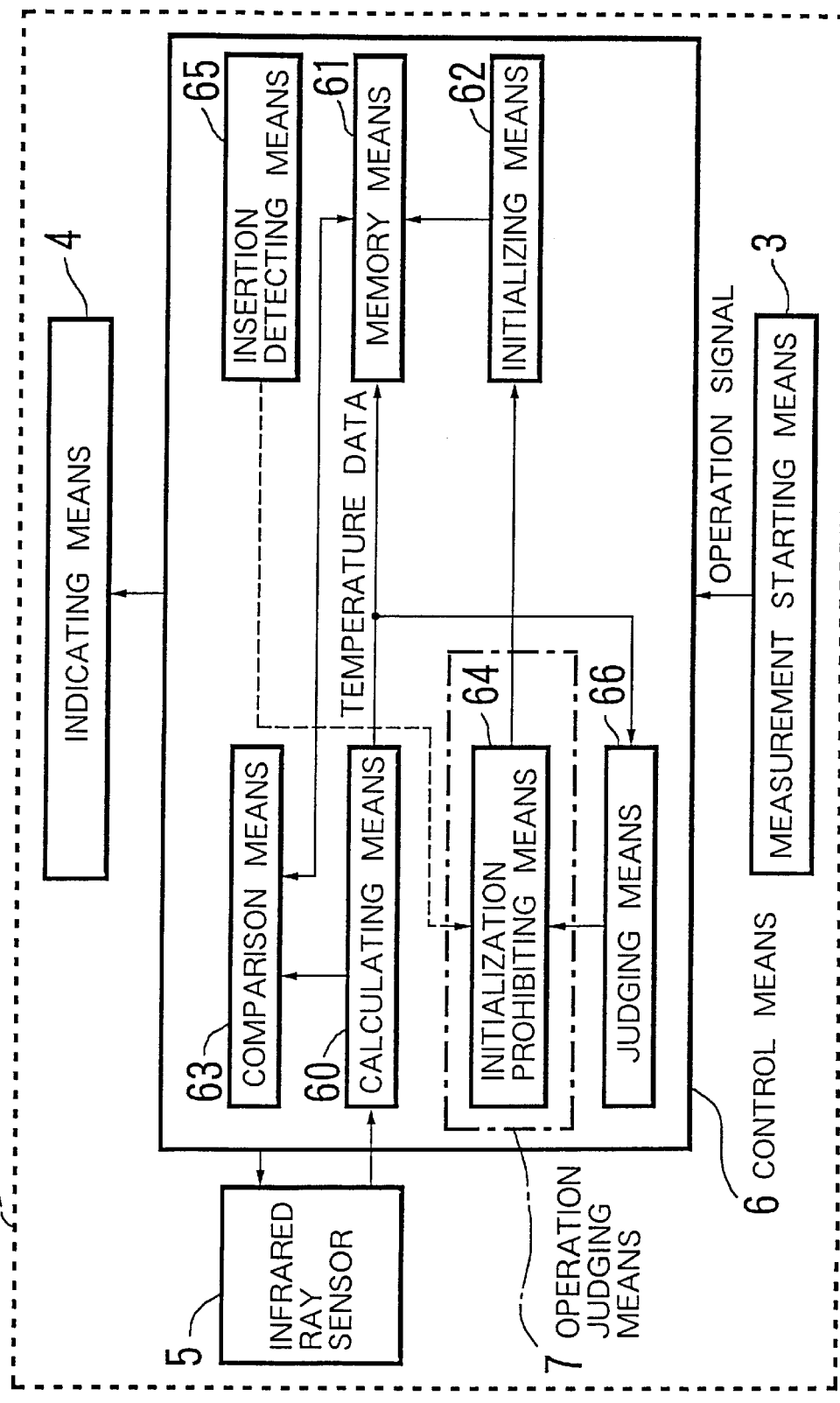
FIG. 5 is a block diagram of a radiation thermometer according to a second embodiment of the present invention.

FIG. 5 is a block diagram of the radiation thermometer according to the second embodiment.

In FIG. 5, the radiation thermometer 1 comprises the measurement starting means 3, the infrared ray sensor 5, the control means 6 and the indicating means 4. The measurement starting means 3, the infrared ray sensor 5 and the indicating means 4 are connected to the control means 6. The measurement starting means 3 comprises the measurement switch 30 which is shown in FIG. 1 and an operation signal generating circuit not shown. As the measurement switch 30 which is disposed at the main portion of the radiation thermometer is pressed, the operation signal generating circuit generates an operation signal which will be outputted to the control means 6.

The indicating means 4 comprises the liquid crystal display portion 40 which is shown in FIG. 1 and a drive circuit (not shown) to drive the liquid crystal display 40. The drive circuit generates a signal for displaying a measured temperature of a measurement target based on data stored in the memory means 61 which will be described later, and outputs the signal to the liquid crystal display portion 40. Thus, the indicating means 4 is structured to indicate a measured temperature of a measurement target based on data which are stored in the memory means 61. Further, the control means 6 controls operations of the indicating means 4.

The control means 6 controls the infrared ray sensor 5 in synchronization with the operation signal, and controls the indicating means 4 such that the liquid crystal display portion 40 displays a measured temperature.

The control means 6 comprises the calculating means 60 for converting data from the infrared ray sensor 5 into temperature data, the memory means 61 for storing a maximum value of the temperature data outputted from the calculating means 60, the initializing means 62 for resetting maximum value data which are stored in the memory means 61, the comparison means 63 for comparing the temperature data outputted from the calculating means 60 with the maximum value data which are stored in the memory means 61, initialization prohibiting means 64 for prohibiting operations of the initializing means 62 during body temperature measuring operations, insertion detecting means 65 for detecting insertion of the probe 2 into an opening of a living being, and judging means 66 for determining whether the body temperature measuring operations are complete based on the temperature data outputted from the calculating means 60 and a predetermined condition. In the second embodiment, the initialization prohibiting means 64, which constitutes operation judging means 7, functions to prohibit initialization performed by the initializing means 62 during a predetermined period of the body temperature measuring operations, whereby the body temperature measuring operations re-starts even when operation for starting measurement is carried out in error, so that erroneous display caused by erroneous operation during this period is avoided. Further, the initialization prohibiting means 64 functions as a nullifying means for avoiding a re-start of the body temperature measuring operations despite erroneous manipulation of the measurement starting means 3.

Next, body temperature measuring operations by the radiation thermometer 1 will be described with reference to the flow chart in FIG. 6.

Figure 6:
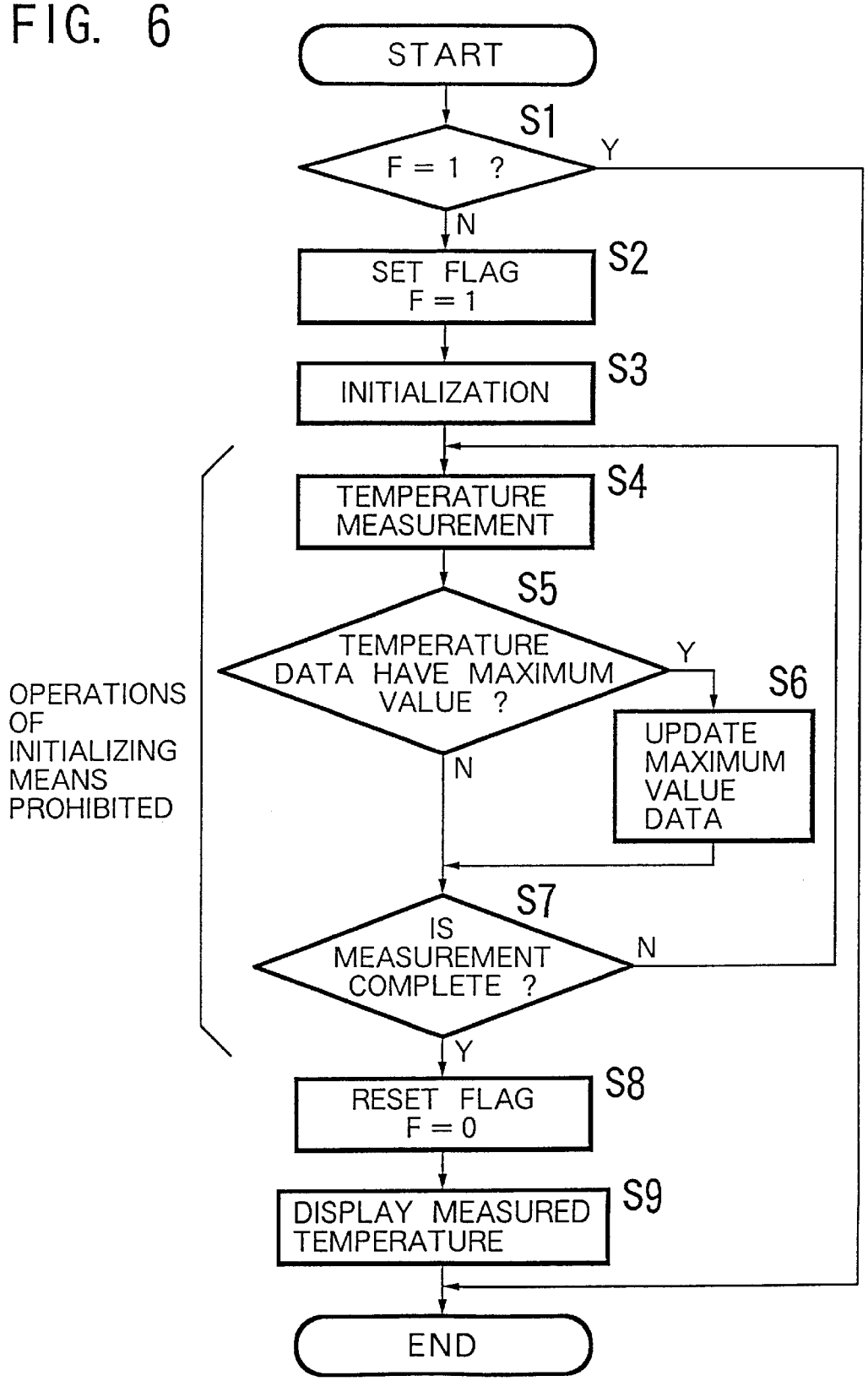
FIG. 6 is a flow chart showing operations of the radiation thermometer according to the second embodiment of the present invention.

In the flow chart in FIG. 6, body temperature measuring operations are started each time the measurement switch 30 is pressed. A prohibition flag F is contained in the initialization prohibiting means 64. When the prohibition flag F is "0", initialization is allowable. When the prohibition flag F is "1", initialization is prohibited.

First, a case where the prohibition flag F is "0" will be described.

After a user (measuring person) presses the measurement switch 30 (START) and determines that the prohibition flag F is "0", the prohibition flag F is set to "1" (S2) and the radiation thermometer 1 starts body temperature measuring operations. The reason for setting the prohibition flag F to "1" is to prohibit initialization. Next, as the initialization processing, the initializing means 62 initializes data which are held in the memory means 61 (S3).

The infrared ray sensor 5 outputs a signal which corresponds to received infrared rays to the calculating means 60. The calculating means 60 computes a temperature based on the signal received from the infrared ray sensor 5 and outputs temperature data (S4). The comparison means 63 compares maximum value data which are stored in the memory means 61 with the temperature data outputted from the calculating means 60 (S5), updates current maximum value data with the temperature data if the temperature data have a larger value, and stores the temperature data as maximum value data in the memory means 61 (S6).

When the judging means 66 determines that body temperature measuring operations are complete based on the temperature data outputted from the calculating means 60 and the predetermined condition (S7), the prohibition flag F is reset to "0" (S8), which makes initialization allowable again.

The control means 6 controls the indicating means 4 so as to display the maximum value data which are stored in the memory means 61, namely, a measured temperature, and the liquid crystal display portion 40 displays the measured temperature (S9). Further, when the judging means 66 determines at step S7 that the predetermined measurement completion condition is not met, the sequence returns to temperature measurement (S4) and operations are repeated until the predetermined measurement complete condition is met.

Next, description will be given on erroneous operation in which the measurement switch 30 is pressed once again in a condition where temperature measurement has already started after the measurement switch 30 has been pressed once, that is, in a condition where the prohibition flag F is "1" (which prohibits initialization).

In this case, since the radiation thermometer 1 has already started body temperature measuring operations with the measurement switch 30 previously pressed (i.e., for the first time), any one of steps S3 through S7 are executed. In this condition, if a user presses the measurement switch 30 once again (for the second time), the current processing which was started by the previous manipulation of the measurement switch 30 (i.e., the first manipulation) is temporarily stopped. Although another series of processing is started by second manipulation of the measurement switch 30 and whether the prohibition flag F is "1" is judged (S1), since the prohibition flag F is "1" (which prohibits initialization), the judgement at step S1 is "YES" and processing is ended quickly (END). Following this, processing which started by the first manipulation of the switch and temporarily stopped is resumed.

Thus, during processing after the measurement switch 30 is pressed while in the middle of body temperature measuring operations, body temperature measuring processing from step S2 to step S9 is not newly executed but the body temperature measuring operations which were started by the previous manipulation of the switch (i.e., first manipulation) are continued.

The second embodiment is summarized as follows. When the radiation thermometer 1 is in a condition where the initialization prohibiting means 64 allows initialization, the memory means 61 is initialized at the start of body temperature measuring operations, which is similar to operations of a conventional radiation thermometer, and the memory means 61 stores maximum value data which are obtained during body temperature measuring operations. The memory means 61 then outputs the maximum value data to the indicating means 4 as a measured temperature, namely, a body temperature. However, in a condition where the initialization prohibiting means 64 prohibits initialization, unlike a conventional radiation thermometer, a new series of body temperature measuring operations is not started even if the measurement switch 30 is pressed, and the body temperature measuring operations which started by the previous manipulation of the switch are continued.

Figure 7:
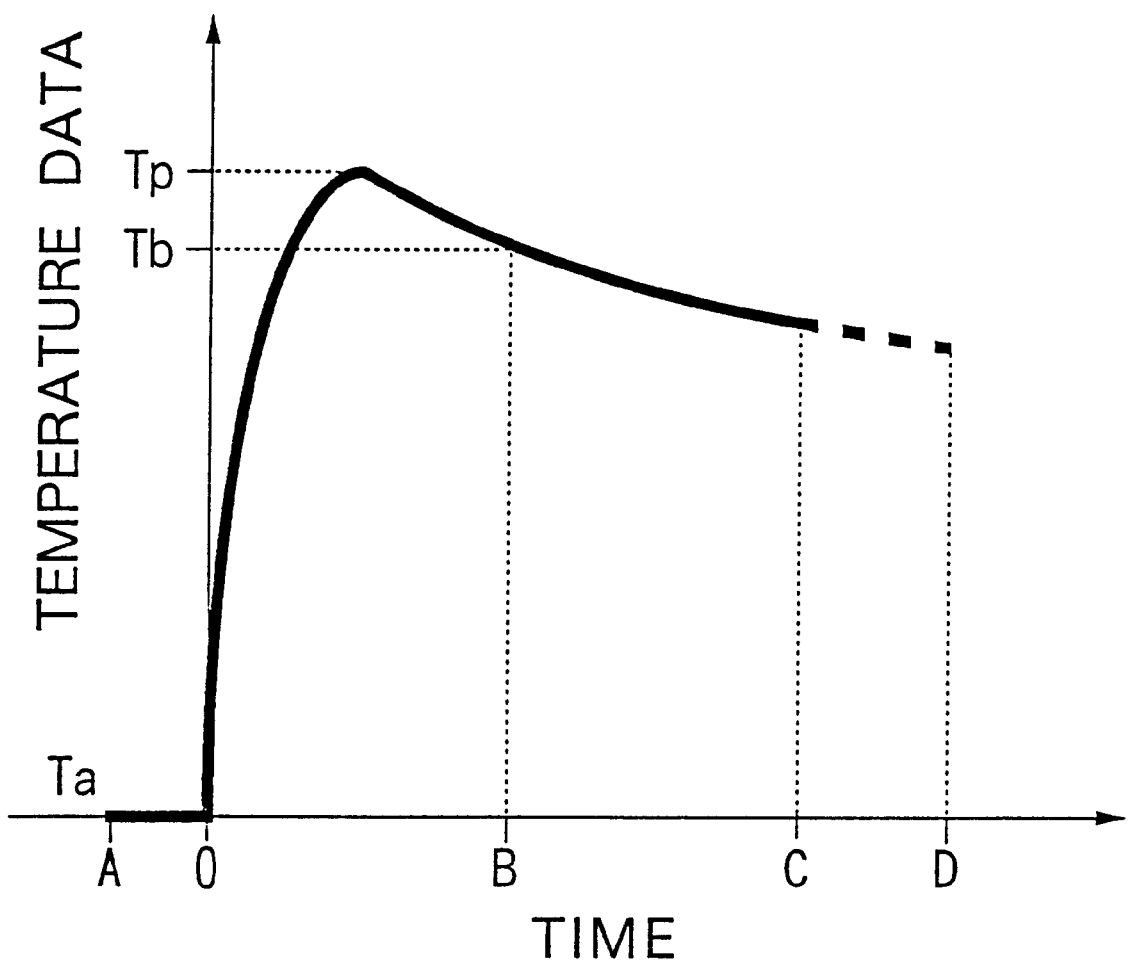
FIG. 7 is a view showing a change in temperature data over time with a probe inserted into an external acoustic opening in the second embodiment of the present invention.

FIG. 7 is a view showing a change in temperature data over time with the probe 2 inserted into an external acoustic opening. Referring to FIG. 7, the relationship between the timing of pressing the measurement switch 30 and a measured temperature, namely, a body temperature will be described. The illustrated change in temperature data over time expresses a change in temperature data which are obtained with the probe 2 inserted into an external acoustic opening at a time "0".

As operation procedures, a case where the measurement switch 30 is pressed at a time "A" which is before insertion into an external acoustic opening will be described.

While the radiation thermometer 1 has already started the body temperature measuring operations before inserting the probe 2 into an external acoustic opening, during a period between the time "A" and the time "0", temperature data Ta of a measurement target to which the probe 2 is directed outside the external acoustic opening are outputted. Although FIG. 7 shows the constant temperature Ta from the time "A" to the time "0", in reality, a value of the temperature Ta changes depending on the manner in which the probe 2 is directed. The radiation thermometer 1 measures a peak temperature Tp immediately after inserting the probe 2 into the external acoustic opening, and as the external acoustic opening is cooled by the probe 2 over time, the temperature data have a progressively lower value. The body temperature measuring operations continue after this and end at a time "C" at which the comparison means 63 determines that the predetermined measurement complete condition is satisfied. Since the peak temperature Tp is stored in the memory means 61 as maximum value data up to that point, the peak temperature Tp is displayed as a measured temperature, namely, a body temperature. Temperature data at and after the time "C" indicated at the dotted line are not outputted as the measurement is already completed. This is a normal operation. Next, a case where the measurement switch 30 is pressed at the time "A" which is before insertion of the probe 2 into an external acoustic opening and the measurement switch 30 is pressed once again at a time "B" after insertion into the external acoustic opening (i.e., an erroneous operation) will be described. For convenience of description of operations according to the second embodiment, a measured temperature as that shown in the flow chart in FIG. 6 which omits the judgement process at step S1 and the process of setting the flag at step S2 will be compared with a measured temperature as that shown in the flow chart which illustrates the second embodiment which requires execution of these two processes.

First, a description will be given in a case where the judgement process at step S1 and the process of setting the flag at step S2 in FIG. 6 are omitted.

In this case, the prohibition flag F is not set and hence "0" so that the initialization prohibiting means 64 allows initialization any time. Since the measurement switch 30 is pressed at the time "A" which is before insertion into an external acoustic opening, the radiation thermometer 1 starts body temperature measuring operations before the probe 2 is inserted into the external acoustic opening. Hence, the radiation thermometer 1 measures a peak temperature Tp which appears immediately after insertion. However, as the measurement switch 30 is pressed once again at the time "B", since the initializing processing (step S3) shown in FIG. 6 is performed, the initializing means 62 deletes peak temperature Tp which is maximum value data stored in the memory means 61. The memory means 61 stores temperature data Tb which are measured at the time "B" instead. Following this, body temperature measuring operations are continued and end at a time "D" at which the judging means 66 determines that the predetermined measurement complete condition is met. Since the memory means 61 stores the temperature data Tb as maximum value data up to that point, a value of the temperature data Tb is displayed as a measured temperature, namely, a body temperature.

Now, the second embodiment which requires to execute the judgement process at step S1 and the process of setting the flag at step S2 will be described.

Since the measurement switch 30 is pressed at the time "A" which is before insertion into an external acoustic opening, the prohibition flag F is set to "1" and the radiation thermometer 1 starts body temperature measuring operations before the probe 2 is inserted into the external acoustic opening. Hence, the radiation thermometer 1 measures the peak temperature Tp which appears immediately after insertion. Although the measurement switch 30 is pressed once again at the time "B", since the prohibition flag F is "1" at that time, the initializing means 62 does not delete the peak temperature Tp which is maximum value data stored in the memory means 61. Following this, the body temperature measuring operations which were started by pressing the measurement switch 30 at the time "A" are continued. The body temperature measuring operations are ended at the time "C" at which the judging means 66 determines that the predetermined measurement complete condition is met. Since the memory means 61 stores the peak temperature Tp as maximum value data up to that point, a value of the peak temperature Tp is displayed as a measured temperature, namely, a body temperature.

As described above, according to the second embodiment, since the initialization prohibiting means 64 prohibits initialization since measurement is started within a predetermined period until measurement is complete, even if the measurement switch 30 is pressed once again during this time, a new series of body temperature measuring operations are not started. In short, the prohibition flag F is judged (S1) immediately after the measurement switch 30 is pressed (START) so that body temperature measuring operations end without executing any processing (END). That is, the initialization prohibiting means 64 serves as a nullifying means for substantially ignoring the operation signal from the measurement starting means 3. The body temperature measuring operations which started by the previous manipulation of the measurement switch 30 are continued in this manner. Hence, data of the memory means 61 to be outputted to the indicating means 4 are the peak temperature Tp which appears immediately after the probe 2 is inserted into an external acoustic opening.

Alternatively, the second embodiment, instead of prohibiting the operations of the initializing means 62 by the initialization prohibiting means 64 immediately after the start of measurement, allows to dispose insertion detecting means 65 for detecting insertion of the probe 2 into an opening of a living being so that the initialization prohibiting means 64 prohibits the operations of the initializing means 62 after the insertion detecting means 65 detects insertion of the probe 2 (as shown by the dotted line in FIG. 5).

Further, temperature data may be outputted to the insertion detecting means 65 from the computing means 60 so that the insertion detecting means 65 determines that the probe is inserted into an external acoustic opening and outputs an insertion detect signal when temperature data are equal to or higher than a predetermined temperature (32° C., for example) are inputted after the measurement switch 30 is pressed and body temperature measuring operations are started and the initialization prohibiting means 64 prohibits the initializing operations from the supply of the insertion detect signal until the end of the measurement.

Further, when the measurement switch is pressed during the predetermined period which prohibits initialization, only the initialization prohibiting means may be prohibited and other operations may be kept effective. Other operations may be a warning of an erroneous operation by means of sounding a buzzer, blinking an LED, etc.

Although an external acoustic opening is selected as an opening of a living being and an eardrum and the external acoustic opening are treated as a measurement site in the second embodiment, the present invention is not limited to this. Instead, an oral cavity may be selected as an opening of a living being so that a sublingual area and gums are treated as measurement sites.

As described above, according to claim 1 of the present invention, since operation judging means for judging whether measurement starting means, i.e. a measurement switch is appropriately manipulated is provided, in the case of an erroneous operation, such as a switch-manipulation of the measurement starting means after inserting a probe into an external acoustic opening and a careless manipulation of the switch again after appropriately manipulating the switch before insertion into the external acoustic opening, it is possible to indicate an erroneous operation and avoid temperature measuring operations started by erroneous operation and display of a temperature. According to claim 2 of the present invention, since the operation judging means is formed by comparison means, it is possible to easily determine whether the measurement starting means is appropriately manipulated only by comparing an output signal from an infrared ray sensor with a predetermined condition.

According to claims 3 and 4 of the present invention, since first measurement data are used to judge whether there is an erroneous operation, judgement of an erroneous operation is facilitated.

According to claim 5 of the present invention, since first measurement data and a plurality of pieces of subsequent measurement data are used to judge whether there is an erroneous operation, judgement of an erroneous operation is easy and reliable.

According to claim 7 of the present invention, since operation nullifying means is a nullifying means which nullifies an operation signal which is received from the measurement starting means during a predetermined period, it is possible to prohibit temperature measuring operations induced by an erroneous operation which occurred after inserting the probe into an opening of a living being and avoid an erroneous display.

According to claim 8 of the present invention, since a probe insertion detecting means is disposed, it is possible to measure once again each time the measurement switch is pressed before inserting the probe into an opening of a living being, and therefore, it is possible to set a prohibition period during which body temperature measuring operations induced by an erroneous operation which occurred after inserting the probe into the opening of the living being is prohibited in an appropriate and reliable manner.

According to claim 9 of the present invention, since only the operations of the initializing means are prohibited, it is possible to execute operations other than initialization when the switch is manipulated during a predetermined period. For instance, it is possible to issue a warning of an erroneous operation by means of sounding a buzzer, blinking of an LED, etc.

According to claim 10 of the present invention, since the probe insertion detecting means outputs an insertion detect signal when first measurement data are equal to or higher than a predetermined value, it is possible to easily detect whether the probe is inserted into an opening of a living being.

According to claim 11 of the present invention, since the predetermined period is a period from the start of measurement to the end of measurement, it is possible to prohibit body temperature measuring operations induced by an erroneous operation throughout a period of temperature measurement in a reliable manner.

Industrial Applicability

The present invention is applicable to a radiation thermometer which measures a body temperature of a human being, as well as a radiation thermometer which measures a temperature a the living being utilizing an opening of the living being.

What is claimed is:

1. A radiation thermometer, comprising:
   an infrared ray sensor for detecting an infrared ray which is incident upon a probe which is inserted into an opening of a living being;
   a control means including calculating means which calculates a measured temperature based on said infrared ray which is detected by said infrared ray sensor;
   an indicating means for indicating said measured temperature; and
   a measurement starting means for outputting, in response to a predetermined manipulation, an operation signal which causes said control means to operate,
   Wherein said infrared ray sensor starts detection when said measurement starting means is manipulated before inserting said probe into an opening of a living being so that a peak temperature of the opening of the living being is detected during insertion of said probe into the opening of the living being, characterized in that said control means comprises operation judging means for judging whether said measurement starting means is appropriately manipulated.

2. The radiation thermometer of claim 1, wherein said operation judging means comprises comparison means for comparing an output signal which is outputted from said infrared ray sensor after measurement is started in a predetermined condition.

3. The radiation thermometer of claim 2, wherein said comparison means compares first measurement data with subsequent measurement data, and when it is detected that said subsequent measurement data are lower than said first measurement data a predetermined number of times, outputs an erroneous operation warning signal which is indicative of an erroneous operation.

4. The radiation thermometer of claim 2, wherein said comparison means outputs an erroneous operation warning signal which is indicative of an erroneous operation when first measurement data are equal to or higher than a predetermined value.

5. The radiation thermometer of claim 4, wherein said predetermined value is set between a body temperature of the living being and an ambient environmental temperature.

6. The radiation thermometer of claim 2, wherein said comparison means outputs an erroneous operation warning signal which is indicative of an erroneous operation when first measurement data are equal to or higher than a predetermined value and it is detected as a result of comparison of said first measurement data and subsequent measurement data that said subsequent measurement data are lower than said first measurement data for a predetermined number of times.

7. The radiation thermometer of claim 1, wherein said operation judging means is a nullifying means which nullifies said operation signal which is received from said measurement starting means during a predetermined period.

8. The radiation thermometer of claim 7, wherein said control means further comprises a probe insertion detecting means for detecting insertion of said probe into an opening of the living being, and said nullifying means nullifies said operation signal during said predetermined period based on an insertion detect signal from said probe insertion detecting means.

9. The radiation thermometer of claim 8, wherein said probe insertion detecting means outputs said insertion detect signal when said first measurement data are equal to or higher than said predetermined value.

10. The radiation thermometer of claim 7, wherein said control means comprises a memory means for storing a maximum value based on an infrared ray which is incident upon said probe and initializing means for initializing said maximum value which is stored in said memory means in response to said operation signal from said measurement starting means, and said nullifying means is initialization prohibiting means which prohibits only operations of said initializing means.

11. The radiation thermometer of claim 7, wherein said predetermined period is a period from the start of measurement to the end of measurement.

* * * * *